(12) United States Patent
Wei

(10) Patent No.: US 6,358,299 B1
(45) Date of Patent: Mar. 19, 2002

(54) VOD REFINING METHOD FOR FAST-CUT STAINLESS STEEL CONTAINING SULPHUR

(75) Inventor: Yu-Sheng Wei, Hsin-Ying (TW)

(73) Assignee: Walsin Lihwa Corp. (TW)

( * ) Notice: Subject to any disclaimer, the term of this patent is extended or adjusted under 35 U.S.C. 154(b) by 0 days.

(21) Appl. No.: 09/443,898

(22) Filed: Nov. 19, 1999

(51) Int. Cl.⁷ .............................................. C21C 7/10
(52) U.S. Cl. .......................................... 75/512; 75/562
(58) Field of Search ........................... 75/512, 562, 511, 75/508

(56) References Cited

U.S. PATENT DOCUMENTS 5,268,141 A * 12/1993 Ototani et al. .............. 420/103
5,753,004 A * 5/1998 Hanai et al. ................ 75/10.64
5,851,262 A * 12/1998 Mukai ......................... 75/309

FOREIGN PATENT DOCUMENTS

JP           406240338   *  8/1994   ................. 75/512

\* cited by examiner

*Primary Examiner*—Melvyn Andrews
(74) *Attorney, Agent, or Firm*—Troxell Law Office PLLC

(57) ABSTRACT

A VOD refining method for fast-cut stainless steel containing sulphur includes a step of VOD refining process, another step of reduction and residue producing and ferrous sulphide adding process, another step of micro-adjusting control process, and a last step of taking out the steel. The feature is to add 0.001 wt %–0.01 wt % CaO and 0.001 wt %–0.005 wt % MgO in the steel liquid during the micro-adjusting control process, in order to elevate sulphur absorption and enhance the aggregate sulphur recycling percentage to more than 85%.

1 Claim, 5 Drawing Sheets

303 steel kind

|     | ID418  | ID419 | ID420 | ID421   | ID450 | ID486 | ID605 |
|-----|--------|-------|-------|---------|-------|-------|-------|
| S1  | 0.271  | 0.251 | 0.293 | 0.40075 | 0.273 | 0.308 | 0.386 |
| S2  | 0.2715 | 0.237 | 0.258 | 0.38    | 0.187 | 0.315 | 0.371 |
| S3  |        | 0.2305 |      | 0.3665  | 0.178 |       | 0.471 |
| S4  |        |       |       | 0.395   |       |       |       |
| S5  |        |       |       | 0.3855  |       |       |       |
| max | 0.2715 | 0.287 | 0.293 | 0.40075 | 0.273 | 0.315 | 0.471 |
| min | 0.271  | 0.251 | 0.258 | 0.3665  | 0.178 | 0.308 | 0.371 |
| var | 0.0005 | 0.036 | 0.035 | 0.03425 | 0.095 | 0.007 | 0.046 |

| the analyzed table of fast-cut steel before improved | | | | |
|---|---|---|---|---|
| oven no | steel liquid (Kg) | S % after adding | S % before adding | S % changing |
| ID418 | 50000 | 0.2715 | 0.271 | 0.0005 |
| ID419 | 50500 | 0.287 | 0.251 | 0.036 |
| ID420 | 51500 | 0.293 | 0.258 | 0.035 |
| ID421 | 51500 | 0.4 | 0.3665 | 0.0335 |
| ID450 | 51000 | 0.273 | 0.178 | 0.095 |
| ID486 | 50000 | 0.315 | 0.308 | 0.007 |
| ID605 | 48500 | 0.417 | 0.371 | 0.046 | the average S % changing value before improved        0.036142857

| the analyzed table of fast-cut steel before improved | | | | |
|---|---|---|---|---|
| oven no | steel liquid (Kg) | S % after adding | S % before adding | S % changing |
| 1G543 | 50600 | 0.347 | 0.341 | 0.006 |
| 1H201 | 51000 | 0.299 | 0.28 | 0.019 |
| 1H225 | 47000 | 0.338 | 0.323 | 0.015 |
| 1H226 | 51500 | 0.332 | 0.32 | 0.012 |
| 1H267 | 48500 | 0.309 | 0.2995 | 0.0095 |
| 1H268 | 48000 | 0.321 | 0.31 | 0.011 |
| 1H269 | 48500 | 0.338 | 0.319 | 0.019 |
| 1H356 | 46000 | 0.33 | 0.326 | 0.004 |
| 1H357 | 49000 | 0.323 | 0.32 | 0.003 |
| 1H365 | 474000 | 0.32 | 0.301 | 0.019 |
| ID605 | 48500 | 0.417 | 0.371 | 0.046 | the average S % changing value after improved        0.01175

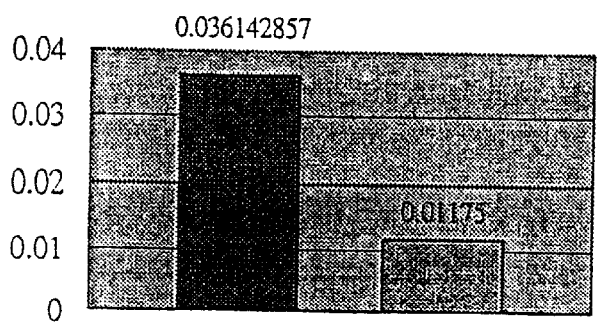

Fig.4

| the analyzed table of fast-cut steel after improved | | | | | | | |
|---|---|---|---|---|---|---|---|
| oven no | steel liquid (Kg) | CaO | MgO | S1% | S2% | Sf% | FeS42% | Yield% |
| 1G543 | 50600 | 512 | 248 | 0.011 | 0.341 | 0.347 | 475 | 85.2 |
| 1H201 | 51000 | 618 | 255 | 0.016 | 0.299 | 0.28 | 400 | 80.2 |
| 1H225 | 47000 | 513 | 252 | 0.009 | 0.323 | 0.338 | 460 | 80 |
| 1H226 | 51500 | 510 | 245 | 0.009 | 0.332 | 0.32 | 450 | 84.9 |
| 1H267 | 48500 | 520 | 245 | 0.016 | 0.309 | 0.2995 | 400 | 81.8 |
| 1H268 | 48000 | 519 | 243 | 0.018 | 0.321 | 0.31 | 400 | 83.6 |
| 1H269 | 48500 | 519 | 243 | 0.024 | 0.338 | 0.319 | 400 | 85.1 |
| 1H356 | 46000 | 512 | 244 | 0.015 | 0.326 | 0.33 | 380 | 90.8 |
| 1H357 | 49000 | 512 | 242 | 0.008 | 0.32 | 0.323 | 450 | 81.7 |
| 1H365 | 474000 | 514 | 242 | 0.01 | 0.32 | 0.301 | 360 | 91.4 | after improved  Yield% AVG=88.3

VOD REFINING METHOD FOR FAST-CUT STAINLESS STEEL CONTAINING SULPHUR

BACKGROUND OF THE INVENTION

This invention relates to a VOD refining method for fast-cut stainless steel containing sulphur, particularly to a method which improves the quality of fast-cut stainless steel by elevating the sulphur contained in the stainless steel.

What is called fast-cut stainless steel is a stainless steel containing sulphur in the scope of 0.25 wt %–0.30 wt and 0.30 wt %–0.35 wt %, which has advantages such as very glossy smoothness of its surface, ease of cutting, causing little tool wear and producing little scrap. Therefore, the tool industry needs quite a large quantity of fast-cut stainless steel.

Conventional refining processes can hardly control the quantity of sulphur contained in the fast-cut stainless steel, with the recycling percentage of sulphur being unstable, and with oxygen volume contained in fast-cut stainless steel being unstable as well (impossible to be kept in the scope of 70 ppm–100 ppm). This leads to poor quality of fast-cut stainless steel, unstable volumes of sulphur contained therein, and poor fast-cut properties, which are drawbacks yet to be resolved by the steel industry.

A tank for containing steel for refining is divided into an upper room for residue, and a lower room for steel. In order to avoid losing a large volume of sulphur in an oxygen vacuum blowing process, ferrous sulphide (or sulphur line, sulpur contained in ferrous sulphide being 29%, and sulphur line being 0.2 kg/m) is added to the steel after it produces residue, the sulphur volume being in the scope of 0.25 wt %–0.35 wt % for obtaining fast-cut steel of fine quality. But the residue phase contains calcium oxide (CaO), manganese oxide (MgO), silica ($SiO_2$), aluminum oxide ($Al_2O_3$), which may cause the sulphur volume added to be absorbed by the steel residue thereby reducing the sulphur percent in the steel. How to elevate the sulphur volume in the steel and how to stabilize the sulphur recycling percentage are the main factors for deciding the quality of fast-cut steel.

As is known from conventional refining methods, basicity is a main parameter in refining for control of the sulphur volume or sulphur recycling percentage.

The definition of basicity is: $V=CaO+MgO/SiO_2+Al_2O_3$. It is generally considered that high basicity (V>1.6) can acquire better sulphur separation, and on the contrary, low basicity (V<1.4) stabilizes the adding effect of sulphur. Applicant has adduced in practical refining processes that the art of adding sulphur by means of low basicity residue causes low sulphur recycling percentage and unstability, resulting in inferior sulphur absorption. This inventor has found in a series of experiments that control of the low basicity residue has the following disadvantages. The related data and analysis are shown in FIGS. 1 and 2. FIG. 1 shows the relation between sulphur recycling percentage and C+M+F of a conventional refining process, with C being CaO, M being MgO, F being calcium fluoride. FIG. 2 shows graphic of change according to random time in a conventional refining process.

1. As shown in FIG. 1, aggregate sulphur recycling percentage of sulphur did not increase as expected due to low basicity. All recycling percentages of sulphur are substantially unstable and distributed substantively wide, with no rule. As shown in the distribution of recycling percentage of sulphur in the figure, recycling percentage of sulphur is low as less than 60% regardless of basicity being 1. Therefore it is hard to use low basicity as a factor in controlling the contained volume of sulphur.

2. As shown in FIG. 2, sulphur is distributed substantively unstably in phases of steel liquid and steel residue, changing with time and with difference. Thus, it is substantively difficult to control material and to adjust added volume, or to obtain an absorbing percentage of sulphur as expected.

It is expected that the low basicity residue method for controlling sulphur volume contained in fast-cut steel cannot effectively stabilize the sulphur volume absorbed or sulphur volume contained therein.

SUMMARY OF THE INVENTION

This invention has been devised to offer a VOD refining method for stabilizing the volume of sulphur absorbed and increasing the control of the sulphur volume contained in fast-cut steel.

The VOD refining method for elevating the sulphur contained in fast-cut steel includes at least the following steps.

1. VOD (Vacuum oxygen decarbonization) refining performed in a steel refining processes, with a steel liquid phase and a constant basicity residue phase formed in the steel tank;
2. a step of reducing and producing residue and adding ferrous sulfide;
3. a step of micro-adjusting control;
4. a step of removing the steel.

The feature is that 0.001 wt %–0.01 wt % CaO and 0.001 wt %–0.005 wt % MgO are added to the liquid steel in the step of micro-adjusting control, thereby elevating the sulphur absorbing percentage of the fast-cut steel and elevating aggregate recycling percent age of sulphur to more than 85%.

BRIEF DESCRIPTION OF THE DRAWINGS

This invention will be better understood by referring to the accompanying drawings, wherein:

FIG. 4 is an analyzing chart of sulphur stabilization of fast-cut steel after being improved by the refining method of the present invention; and, FIG. 5 is an analyzing chart of sulphur recycling of fast-cut steel improved by the refining method of the present invention.

DETAILED DESCRIPTION OF THE PREFERRED EMBODIMENT

Figure 1:
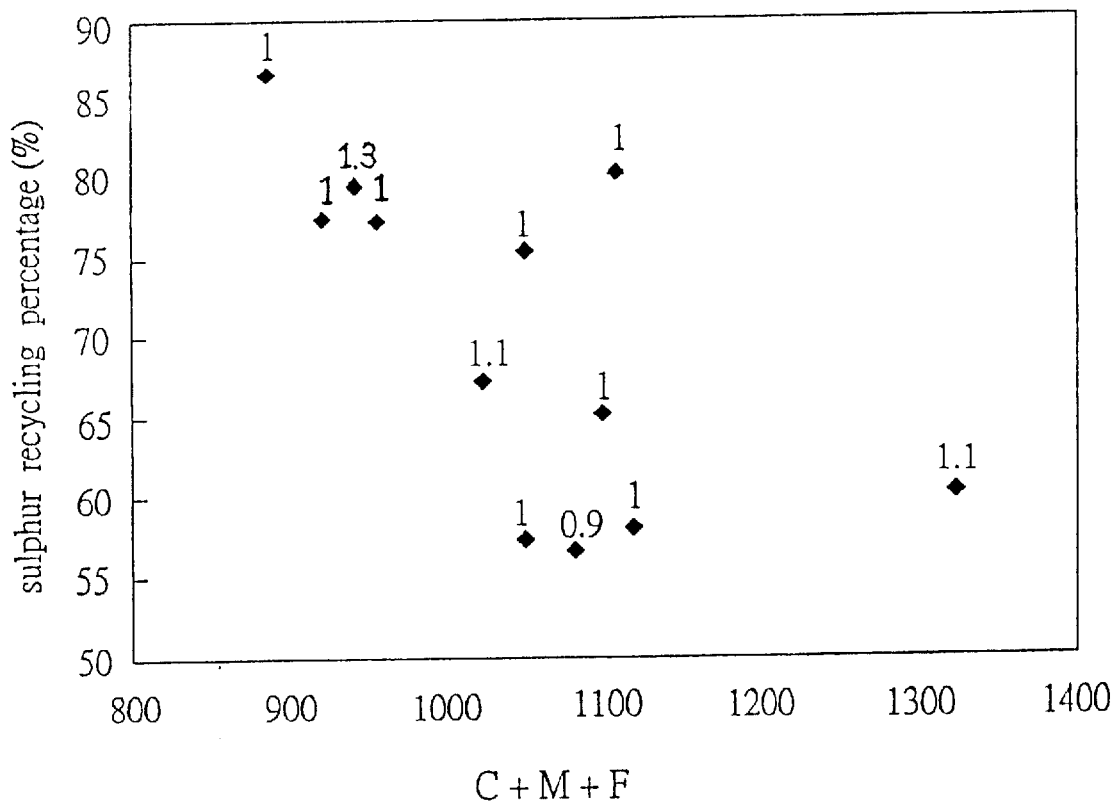
FIG. 1 is a chart showing sulphur recycling percentage versus C+M+F in a conventional refining processes.
Figure 2:
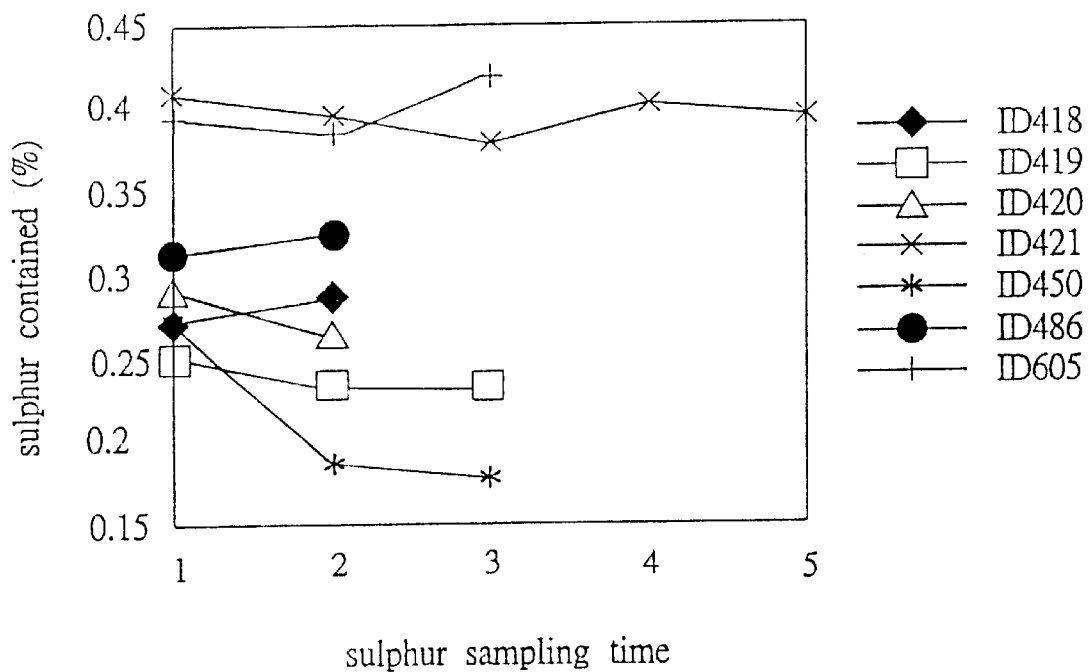
FIG. 2 is a chart illustrating sulphur sampling time in a conventional refining processes.

As can be understood from FIGS. 1 and 2, the conventional art of controlling basicity lower than a predetermined value (the value of $CaO+1MgO/SiO+Al_2O_3$ being approximately 1.4) has the following drawbacks.

1. The aggregate sulphur recycling percentage cannot rise as expected due to low basicity, and substantial instability.
2. Phase distribution of sulphur in the steel liquid and steel residue is substantially unstable, changing differently with time, so it may be quite difficult to perform material control or to adjust by adding elements.

Generally speaking, control of low basicity residue by conventional methods has no relation with the aggregate sulphur recycling percentage. Therefore, it may not be expected that sulphur can be absorbed stably, or that sulphur contained in fast-cut steel can be controlled.

It may be found in the relation between sulphur recycling percentage and C+M+F shown in FIG. 1 that the aggregate sulphur recycling percentage may have a relation with C+M+F (or CaO+MgO+CaF$_2$). When basicity is controlled at a definite value, and if C+M+F is low in value, it seems that the aggregate sulphur recycling percentage is elevated, and kept in a stable state.

Figure 3:
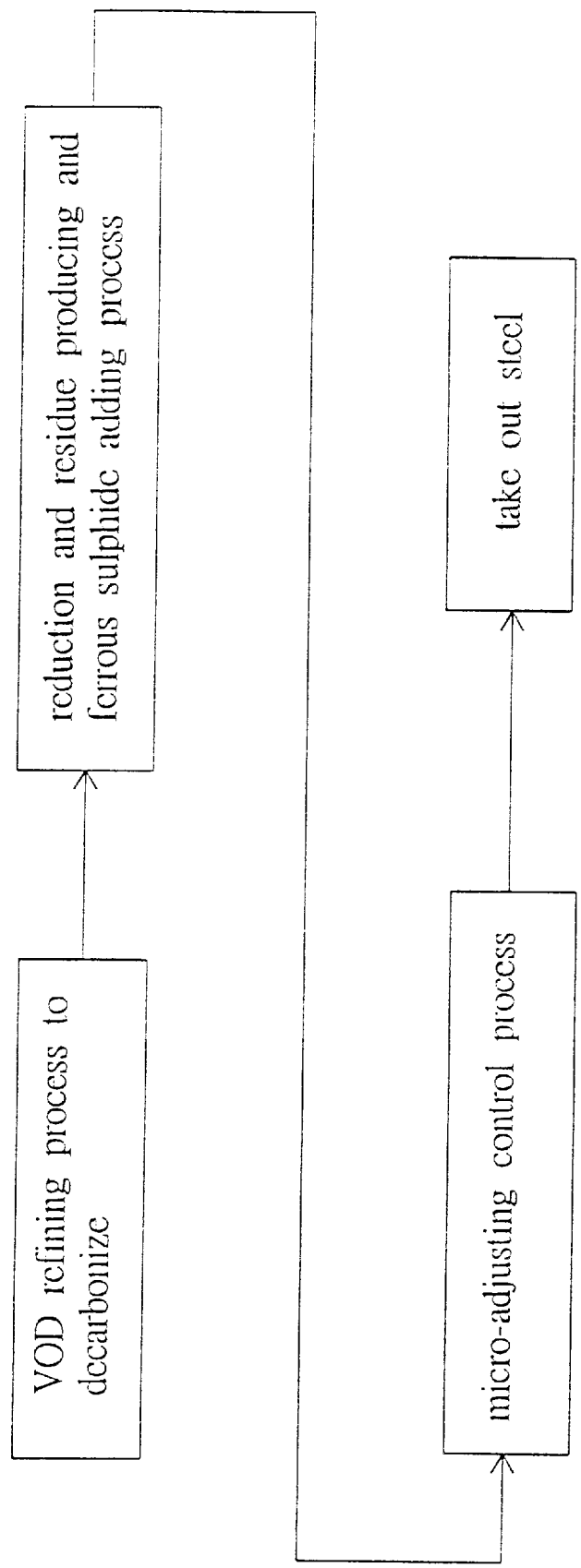
FIG. 3 is a flow chart of the VOD refining method for fast-cut steel containing sulphur of the present invention.

A VOD refining method for fast-cut steel containing sulphur in the present invention, as shown in FIG. 3, includes a first step of a VOD refining process to decarbonize the steel by means of blowing air in vacuum conditions to wholly remove carbon in the steel liquid; a second step of reduction and residue producing and adding Cr (chromium), Mn (manganese), etc., in the steel tank to form a steel phase and a residue phase therein and adding ferrous sulphide (or sulphur line) in the steel liquid after formation of the steel phase and residue phase; a third step of micro-adjusting control after checking the steel liquid by random sampling to ascertain the Cr, Mn, S etc. elements contained in the steel liquid and adding a proper volume therein if their volume is not proper; and a fourth step of removing the steel after its temperature falls to a predetermined value.

As the control of C+M+F is a key factor affecting the aggregate sulphur recycling percentage and sulphur contained in steel liquid, the main control in the invention lies in controlling proper value of C+M+F, elevating the aggregate sulphur recycling percentage to a constant one, which control is mainly guided by the response mechanism described below.

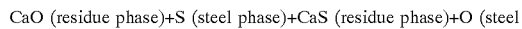
CaO (residue phase)+S (steel phase)+CaS (residue phase)+O (steel phase) ΔH>O

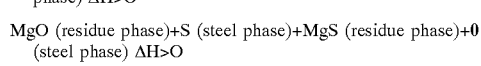
MgO (residue phase)+S (steel phase)+MgS (residue phase)+0 (steel phase) ΔH>O The inventor has found in experiments that the equation just described does not easily respond in case of low S (steel residue) concentration (such as<0.01 wt) but it has to be carried out under the condition of high concentration of CaO (residue phase) and high temperature. He has found in many experiments that as long as the S (steel residue) contains as high as 2500 ppm, the response may be carried out. In other words, if the responding temperature of CaO is not high, the response can proceed, forming CaO and MgS to move into the residue phase and lowering sulphur contained in the steel liquid. And it has to be emphasized that this residue producing process is indispensable to recycle metals such as Cr, Mn and oxygen contained. The inventor has found in experiments that as long as the volume of CaO and MgO added is controlled in the steel tank, control of the quality of fast-cut steel is ensured.

Adding 0.001 wt %–0.01 wt % CaO and 0.001 wt %–0.005 wt % MgO in the micro-adjusting process can effectively stabilize the sulphur absorbed in and elevating control capability of controlling the sulphur contained in fast-cut steel.

Figure 5:
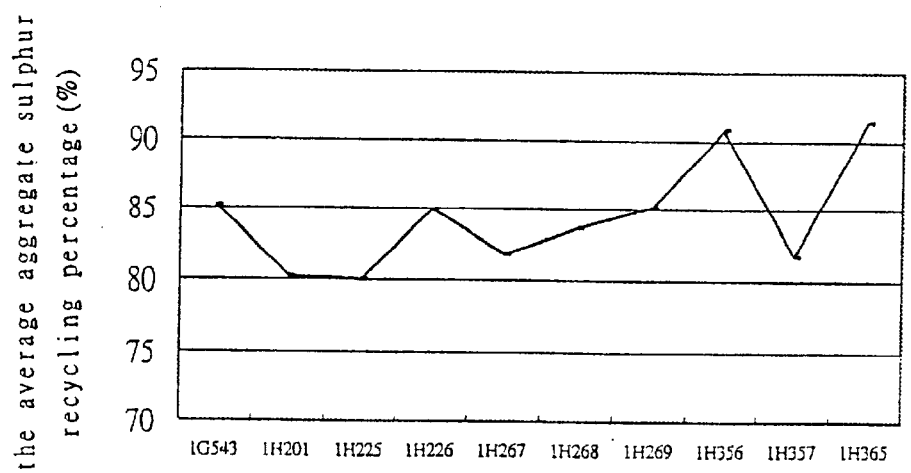

Next, referring to FIGS. 4 and 5, it is clearly understood that the stabilized volume of sulphur contained in the fast-cut steel is improved substantially after ferrous sulphide (or sulphur line) is added to the steel liquid. In the analyzed table of fast-cut steel before improvement, sulphur volume in the measured steel liquid changes substantially, the average changing value is high at more than 0.36%. But in the analyzing table of fast-cut steel after improvement, the average sulphur changing value is lowered to 0.011% after ferrous sulphide is added. This indicates that a balancing speed of steel liquid phase and steel residue phase has been improved in the present invention, overcoming the second drawback of the prior art described above.

As can be understood from FIG. 5, the average aggregate sulphur recycling percentage according to the instant refining method reaches as high as 85%, verified from practical operation and tests. In addition, it has a substantial stability and recurrence, overcoming the first drawback of the prior art described above. Besides, oxygen contained in fast-cut steel can be effectively controlled in the scope of 70 ppm–100 ppm, which is beneficial to the fast-cutting properties of steel. The inventor has also found in experiments that basicity is lowered if CaF$_2$ or Al is added to the steel residue. When basicity is low, steel residue easily liquefies. But if steel residue liquefies excessively, it quite easily invades the firebricks of the steel tank. If the Al volume contained in the steel liquid is too high, it hurts fast cutting properties of fast-cut stainless steel. So CaF$_2$ or Al is preferably not contained in the chemicals added for producing the residue.

Now a preferred embodiment of the invention is to be described in conjunction with a manufacturing processes.

The invention is suitable for VOD refining, so its VOD refining processes is explained in the following steps, based on 50 tons for an example:

1) VOD (Vacuum oxygen decarbonization) refining process;
2) reduction of residue producing and ferrous sulphide adding process;
3) micro-adjusting control process; and,
4) taking out steel process.

Under the principle that C+M+F value has to be kept under a specific value, the best adding proportion in the refining processes is maintained as 0.001 wt %–0.01 wt % CaO and 0.001 wt %–0.005 wt % MgO, so 500 kgs CaO and 250 kgs MgO have to be added in the 50 ton steel for acquiring the best quality stainless steel.

As can be realized from the above description, the invention has the following advantages.

1. High Sulphur absorption in the refining process of the invention; and sulphur volume contained in the fast-cut stainless steel for every round of production is measured as varying little (controllable within the scope of 0.011% average value). The quality of fast-cut stainless steel is stably controlled in every round of production according to the invention, and sulphur volume conforms as that preset.
2. High and stable aggregate sulphur recycling percentage: the aggregate sulphur recycling percentage is high as 85%, and the varying percentage is very low, approximately ±5%.
3. Fine fast-cut quality of fast-cut stainless steel according the refining method of the invention: oxygen contained is controlled within 70 ppm–100 ppm, with the fast-cut property improved.
4. Elevated efficiency of the refining method: sulphur absorption and aggregate recycling percentage is elevated in the refining method of the invention, enhancing control capabilities of the sulphur contained in fast-cut stainless steel, stabilizing the sulphur volume therein. So controlling engineers need not wait until after completion of the refining processes, to carry out adjustments. In the refining processes of the invention, the parameter is preset before carrying out the refining processes, saving waiting time needed for checking data.

While the preferred embodiment of the invention has been described above, it will be recognized and understood that various modifications may be made therein and the appended claims are intended to cover all such modifications which may fall within the spirit and scope of the invention.

What is claimed is:

1. A vacuum oxygen decarbonization (VOD) refining method for producing stainless steel containing sulphur, comprising the steps of:

a) refining stainless steel containing carbon using a vacuum oxygen decarbonization process to remove carbon from the stainless steel;

b) adding elements to the stainless steel to form a steel phase and a steel residue phase, the elements including at least chromium and manganese and excluding $CaF_2$ and Al;

c) adding ferrous sulphide to the stainless steel;

d) adding between 0.001 wt %–0.01 wt % of CaO and between 0.001 wt %–0.005 wt % of MgO to the stainless steel to elevate sulphur absorption in the stainless steel whereby an aggregate sulphur recycling percentage is greater than 85%; and, e) separating the steel phase from the steel residue phase.

* * * * *